Oct. 15, 1963

T. D. HURDEL 3,106,951

PNEUMATIC TIRE

Filed Dec. 26, 1961

INVENTOR
THOMAS D. HURDEL

BY Ernest Montague

ATTORNEY.

ns patent office 3,106,951
Patented Oct. 15, 1963

3,106,951
PNEUMATIC TIRE
Thomas Donald Hurdel, 42—29 Judge St.,
Elmhurst 73, N.Y.
Filed Dec. 26, 1961, Ser. No. 161,875
3 Claims. (Cl. 152—334)

The present invention relates to a pneumatic tire consisting of a plurality of independent sections, each of which is capable of being independently attached and detached from the wheel, so that in case of a blow-out or puncture of one of the sections of the tire it is merely necessary to repair or replace the particular section wherein the puncture or blow-out exists.

Pneumatic tires have been proposed before which consist of a plurality of sections, and are characterized by a complicated structure and accordingly require comparatively high manufacturing costs, which are prohibitive. This was the main reason why this preferred structure has not been accepted broadly on the market.

It is, therefore, one object of the present invention to provide a pneumatic tire which is of simple structure and accordingly of comparatively low manufacturing cost.

It is another object of the present invention to provide a pneumatic tire wherein an inner base plate and an outer base plate are disposed along the outer surface of a wheel rim, the inner base plate being secured to the outer base plate by a threaded bolt and prongs extending from the outer base plate through corresponding perforations of the wheel rim permit the securing of the base plates to the wheel rim, the connection between the tire section and the corresponding base plates being achieved by means of a metal sheath, one end of which is embedded into the inner ends of the tire section, while the other end thereof is clamped between the inner base plate and the outer base plate. Particular means are provided to retain the base plates in engagement with the outer face of the wheel rim.

With these and other objects in view which will become apparent in the following detailed description, the present invention will be clearly understood, in connection with the accompanying drawing in which.

Figure 1:
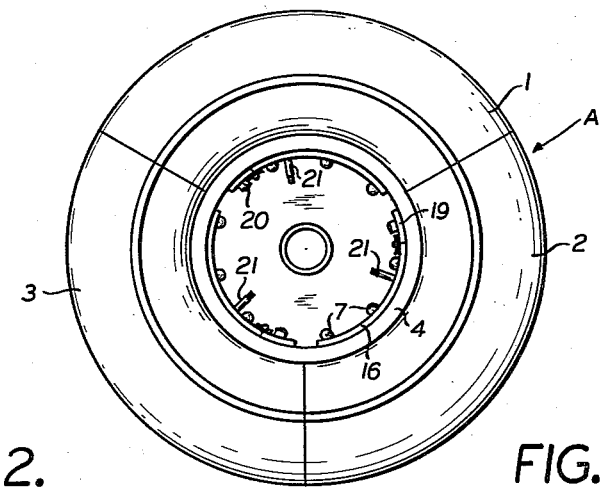
FIGURE 1 is a front elevation of the complete tire.

Referring now to the drawing, the pneumatic tire as shown by example in the drawing, comprises three tire sections, each extending for about an angle of 120° to complement each other and form together a complete tire A.

Since each of the tire sections 1, 2 and 3 is of a structure identical with the other sections and merely engages the adjacent tire sections at the end faces, it will suffice to describe one of the tire sections only.

The tire sections 1, 2 and 3 are mounted on a conventional wheel rim 4 and form together the complete tire A.

Figure 2:
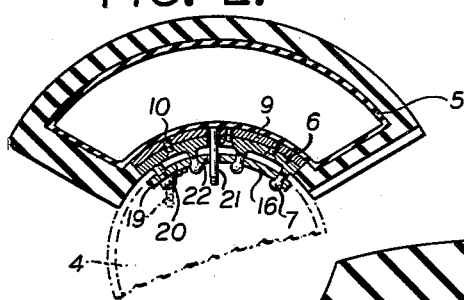
FIG. 2 is a section through a tire section indicating the securing means to the wheel rim, the section being taken in a plane perpendicular to the wheel axis.
Figure 4:
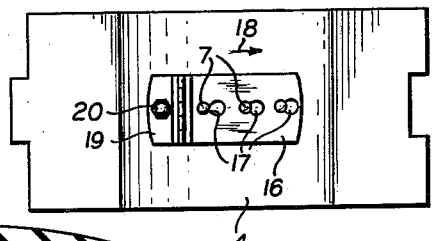
FIG. 4 is an elevation of a locking plate mounted on the inner face of the wheel rim.
Figure 3:
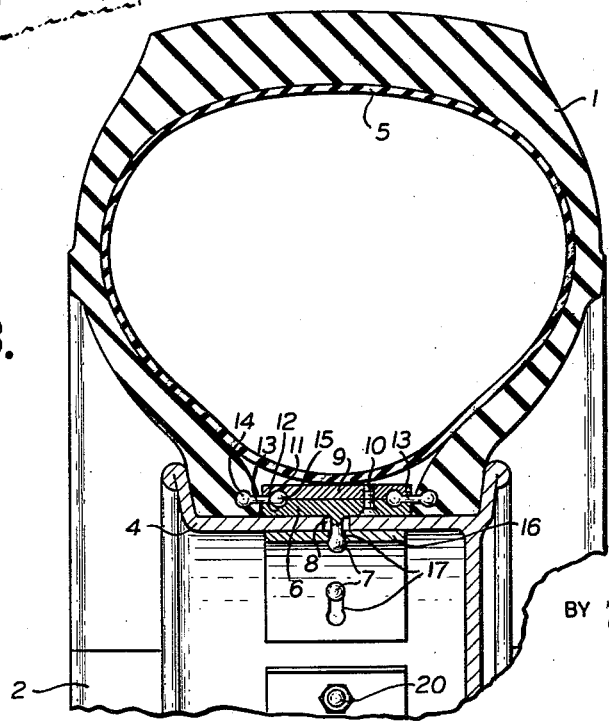
FIG. 3 is a section through a tire section in a plane extending through the wheel axis.

Referring now particularly to FIGS. 2 and 3, the tire section 1 has inserted therein a tube 5.

An inner base plate 6 engages the outer face of the periphery of the wheel rim 4 and is equipped with a plurality of prongs 7 longitudinally spaced apart from each other, which prongs 7 extend through corresponding perforations 8 of the wheel rim 4. The inner base plate 6 has a curvature complementary to the outer face curvature of the wheel rim 4, in order to provide a good engagement between the inner face of the inner base plate 6 and the outer face of the wheel rim 4. An outer base plate 9 engages the outer face of the inner base plate 6 and has a curved shape again complementary to the shape of the inner base plate 6. A screw bolt 10 secures the inner base plate 6 to the outer base plate 9, both base plates being formed preferably of steel or any other suitable alloy providing sufficient strength and resistance.

Complementary recesses 11 and 12 are provided in the opposite engaging faces of the inner base plate 6 and the outer base plate 9, in which recesses are received one of the enlarged head portions of a plurality of metal sheath members 13, preferably of aluminum or the like, the latter being equipped at the other end with another enlarged head portion which is embedded into the tire section 1. Thus the enlarged head portions 14 and 15 retain the sheath member 13 in position, since the head portion 14 is vulcanized into the tire, while the head portion 15 is clamped between the inner base plate 6 and the outer base plate 9, thus retaining the tire section 1 in a position secured to the base plates 6 and 9.

Upon securing the section assembly consisting of the particular tire section 1, the outer base plate 9 and the inner base plate 6, secured by means of a metal sheath member 13 to the tire section 1, to the wheel rim 4, by setting the prongs 7 projecting inwardly from the inner base plate 6 through the perforations of the wheel rim 4, means must be provided to secure now each of the tire sections assembly to the wheel rim 4.

In order to achieve this end, a locking plate 16 is disposed at the inner face of the wheel rim 4, which locking plate 16 has a curvature again complementary to the curvature of the inner face of the wheel rim 4. The locking plate 16 is equipped with a plurality of longitudinal slots 17 which are widened at one end and which are spaced apart from each other at a distance equal with the angular distance between the prongs 7. Each of the slots 17 has at one end a widened portion, having an open diameter larger than the end portion of the prongs 7, while the width of the remaining portion of the slots 17 is smaller than the greatest diameter of the end portion of the prongs 7. By this arrangement it is possible that the locking plate 16 is mounted, as shown by example in the drawing, over three prongs 7. By moving of the locking plate 16 in longitudinal direction, namely in the direction of the arrow 18, the widened head portion of all the prongs 7 reaches a position opposite the narrow portion of the slots 17 and thereby locks the plate in position.

In order to prevent an involuntary return movement in a direction opposite to that of the arrow 18, the locking plate 16 has hinged thereto an end portion 19 which can be retained in position by means of a bolt 20 extending inwardly from the inner base plate 6, the bolt 20 being received in a bore of the end portion 19 and secured by an elastic stop nut threadedly secured to the bolt 20, thereby locking the locking plate 16 against longitudinal movement.

In order to change a tire section, it is merely necessary to remove the bolt 20 which is received in the inner face of the wheel rim 4, whereupon the end portion 19 of the locking plate 16 can be slightly turned over and then axial movement of the locking plate 16 is permitted to return the widened head portions of the prongs 7 into the widened portion of the slots 17, whereupon the entire tire section assembly can be removed and replaced by a new one.

As clearly shown in FIGS. 1 and 2, each of the tire sections is equipped with a valve 21 which extends through the outer base plate 9, the inner base plate 6 and the wheel rim 4. In order to provide for the longitudinal movement of the locking plate 16, it is necessary to arrange a longitudinal slot 22 at the particular valve location in the locking plate 16.

While I have disclosed one embodiment of the present invention, it is to be understood that this embodiment is given by example only and not in a limiting sense, the scope of the present invention being determined by the objects and the claims.

I claim:

1. A pneumatic tire mounted on a wheel rim comprising a plurality of tire sections,
   all said tire sections complementing each other to form jointly a complete tire, and
   each of said tire sections comprising
   an inner base plate engaging a portion of said wheel rim and having a plurality of prongs angularly spaced apart from each other and adapted to extend through perforations of said wheel rim,
   an outer base plate engaging with its inner face the outer face of said inner base plate and means for securing together said base plates,
   said base plates having complementary recesses in their opposite engaging faces,
   means for connecting said tire sections with said inner base plate and said outer base plate, said connecting means comprising a longitudinal sheath member having enlarged end portions, one of said end portions being embedded in said tire section, and the other of said end portions being clamped between said base plates,
   one end of said connecting means being received in said recesses of said inner and outer base plates, and means for securing said inner and outer base plates to said wheel rim.

2. A pneumatic tire, as set forth in claim 1, wherein said securing means comprises
   a locking plate engaging the inner face of said wheel rim and having a plurality of longitudinal slots spaced apart from each other,
   each of said slots has at one end a portion of a width greater than the end portion of said prongs and a remaining portion of a width slightly smaller than the greatest diameter of said prongs, so that upon longitudinal movement of said locking plate relative to said wheel rim, said locking plate locks said base plates into position, and
   means for retaining said locking plate in said locking position.

3. A pneumatic tire, as set forth in claim 2, wherein said retaining means comprises
   an end portion of said locking plate hingedly connected thereto, and
   a bolt extending through said end portion and received by said wheel rim, thereby preventing any longitudinal movement of said locking plate.

References Cited in the file of this patent

UNITED STATES PATENTS

| | | |
|---|---|---|
| 1,117,623 | Bailey | Nov. 17, 1914 |
| 1,413,834 | Dickson | Apr. 25, 1922 |
| 1,658,426 | Buffo | Feb. 7, 1928 |